United States Patent
Danivas et al.

(10) Patent No.: US 11,374,872 B1
(45) Date of Patent: Jun. 28, 2022

(54) METHODS AND SYSTEMS FOR ADAPTIVE NETWORK QUALITY OF SERVICE FOR LATENCY CRITICAL APPLICATIONS

(71) Applicant: Pensando Systems Inc., Milpitas, CA (US)

(72) Inventors: Vishwas Danivas, Santa Clara, CA (US); Murty Subba Rama Chandra Kotha, San Jose, CA (US); Balakrishnan Raman, Fremont, CA (US); Sanjay Shanbhogue, Santa Clara, CA (US); Harinadh Nagulapalli, San Jose, CA (US); Michael Brian Galles, Los Altos, CA (US); Neel Patel, San Jose, CA (US)

(73) Assignee: Pensando Systems, Inc., Milpitas, CA (US)

( * ) Notice: Subject to any disclaimer, the term of this patent is extended or adjusted under 35 U.S.C. 154(b) by 55 days.

(21) Appl. No.: 17/115,516

(22) Filed: Dec. 8, 2020

(51) Int. Cl.
*H04L 47/00* (2022.01)
*H04L 47/6275* (2022.01)
*H04L 47/62* (2022.01)
*H04L 67/1097* (2022.01)

(52) U.S. Cl.
CPC ...... *H04L 47/6275* (2013.01); *H04L 47/6215* (2013.01); *H04L 67/1097* (2013.01)

(58) Field of Classification Search
CPC .............. H04L 47/6275; H04L 47/6215; H04L 67/1097; H04L 49/205; H04L 49/358; H04L 49/9068; H04L 61/6063

USPC .......................................................... 370/230
See application file for complete search history.

(56) References Cited

U.S. PATENT DOCUMENTS

| | | | |
|---|---|---|---|
| 6,810,426 B2 | 10/2004 | Mysore et al. | |
| 7,027,457 B1 | 4/2006 | Chiussi et al. | |
| 7,292,580 B2 | 11/2007 | Ramamurthy et al. | |
| 8,861,344 B2 | 10/2014 | Trinh et al. | |
| 9,450,881 B2 | 9/2016 | Dumitrescu et al. | |
| 10,237,171 B2 | 3/2019 | Gobriel et al. | |
| 10,868,769 B1* | 12/2020 | Matthews | H04L 47/6225 |
| 11,055,028 B1* | 7/2021 | Kamran | G06F 3/067 |
| 11,099,902 B1* | 8/2021 | Matthews | H04L 67/2833 |
| 11,275,509 B1* | 3/2022 | Colgrove | G06F 3/0688 |
| 2020/0153739 A1* | 5/2020 | Gafni | H04L 49/3027 |
| 2021/0014177 A1* | 1/2021 | Kasichainula | G06F 13/28 |
| 2021/0034552 A1* | 2/2021 | Gokam | G06F 3/0607 |
| 2021/0075732 A1* | 3/2021 | Singh | H04L 47/808 |
| 2021/0132858 A1* | 5/2021 | Kamran | G06F 3/0688 |
| 2021/0328944 A1* | 10/2021 | Kasichainula | H04L 47/39 |
| 2021/0406241 A1* | 12/2021 | Patel | G06F 16/128 |
| 2022/0006750 A1* | 1/2022 | Livne | H04L 47/2416 |

(Continued)

*Primary Examiner* — Robert J Lopata
(74) *Attorney, Agent, or Firm* — Loza & Loza LLP

(57) ABSTRACT

A multitude of data transfer queues can have data transfer operations that are scheduled for a processing circuit to perform. Some of the data transfer queues may submit so many or such large data transfer operations that others receive little or no attention. The situation can be resolved in the data plane via a processing circuit that performs the data transfer operations in conjunction with priority evaluation operations that can assign the data transfer queues to different scheduler priority classes. A scheduler can schedule data transfer operations based on the scheduler priority classes of the data transfer queues.

20 Claims, 13 Drawing Sheets

(56) References Cited

U.S. PATENT DOCUMENTS

2022/0046462 A1* 2/2022 De Andrade Jardim .................... H04L 47/2416
2022/0091761 A1* 3/2022 Patel .................... G06F 3/0629

* cited by examiner

METHODS AND SYSTEMS FOR ADAPTIVE NETWORK QUALITY OF SERVICE FOR LATENCY CRITICAL APPLICATIONS

TECHNICAL FIELD

The embodiments relate to computer networks, storage area networks, ethernet, InfiniBand (IB), channel adapters, network appliances, packet processing pipelines, P4 packet processing pipelines, programmable packet processing pipelines implemented using special purpose circuitry, and HPC (high performance computing).

BACKGROUND

High performance computing environments and data warehouses transfer massive amounts of data over computer networks. Applications running on the servers all use the computer network and some applications may monopolize the network such that other applications may be starved of network resources. In many cases, a single server is running many applications, pieces of applications, and virtual machines that communicate with other applications, virtual machines, and servers via a network interface card in the server. Applications can place outgoing network traffic can be placed on data transfer queues. The network interface card can process the data transfer queues and thereby transmit network traffic using a variety of protocols such as internet protocol (IP), transmission control protocol (TCP), user datagram protocol (UDP), InfiniBand, non-volatile memory express (NVMe), internet small computer systems interface (iSCSI), and remote direct memory access (RDMA). As such, at the server level it is possible for some applications to monopolize the network interface card such that other applications are poorly served.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a network appliance. The method can include storing data transfer queues that are configured to hold data transfer directives, assigning the data transfer queues to scheduler priority classes that include a first class and a second class, and scheduling, based at least in part on the scheduler priority classes, execution of the data transfer directives by a processing circuit. The method can also include performing, by the processing circuit, a data transfer operation based on a scheduled data transfer directive from one of the data transfer queues that is assigned to the first class, and executing, by the processing circuit and in conjunction with the data transfer operation, a priority evaluation operation that assigns the one of the data transfer queues to the second class.

Another aspect of the subject matter described in this disclosure can be implemented by a network appliance comprising a memory configured to store a plurality of data transfer queues that are assigned to a plurality of scheduler priority classes including a first class and a second class, a scheduler configured to schedule data transfer directives held by the data transfer queues for execution by a processing circuit, the scheduling based at least in part on the scheduler priority classes, and the processing circuit. The processing circuit can be configured to perform a data transfer operation based on a scheduled data transfer directive from one of the data transfer queues that is assigned to the first class, and execute, in association with the data transfer operation, a priority evaluation operation that assigns the one of the data transfer queues to the second class.

Yet another aspect of the subject matter described in this disclosure can be implemented by a system comprising a means for storing a plurality of data transfer queues that are assigned to a plurality of scheduler priority classes and that are configured to hold data transfer directives, a means for scheduling the data transfer directives for execution based at least in part on the scheduler priority classes, and a means for reassigning the scheduler priority classes of the data transfer queues in conjunction performing data transfer operations based on the data transfer directives that are scheduled for execution.

In some implementations of the methods and devices, the method includes performing, by the processing circuit, a second data transfer operation based on a second scheduled data transfer directive from a second one of the data transfer queues assigned to the first class, and executing, by the processing circuit and in association with the second data transfer operation, a second priority evaluation operation that leaves the second one of the data transfer queues assigned to the first class.

In some implementations of the methods and devices the data transfer queues include InfiniB and RDMA send queues. In some implementations of the methods and devices the data transfer queues include ethernet transmit queues. In some implementations of the methods and devices the data transfer queues include NVMe submission queues. In some implementations of the methods and devices the data transfer queues include at least one of an InfiniB and RDMA send queue, an ethernet transmit queue, and an NVMe submission queue.

In some implementations of the methods and devices the priority evaluation operation assigns the one of the data transfer queues to the second class based at least in part on a bandwidth usage of the one of the data transfer queues. In some implementations of the methods and devices the priority evaluation operation assigns the one of the data transfer queues to the second class based at least in part on a queue depth of the one of the data transfer queues. In some implementations of the methods and devices the priority evaluation operation assigns the one of the data transfer queues to the second class based at least in part on a last serviced time of the one of the data transfer queues. In some implementations of the methods and devices the priority evaluation operation assigns the one of the data transfer queues to the second class based at least in part on a size of the data transfer operation of the one of the data transfer queues.

In some implementations of the methods and devices the priority evaluation operation assigns the one of the data transfer queues to the second class based at least in part on a metadata value that is associated with the data transfer operation, wherein the metadata value indicates at least one of a tenant, a service level agreement, and an application. In some implementations of the methods and devices the processing circuit is a P4 packet processing pipeline.

In some implementations of the methods and devices the processing circuit is configured to perform a second data transfer operation based on a second scheduled data transfer directive from a second one of the data transfer queues assigned to the first class, and is also configured to execute, in conjunction with the second data transfer operation, a second priority evaluation operation that leaves the second one of the data transfer queues assigned to the first class.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
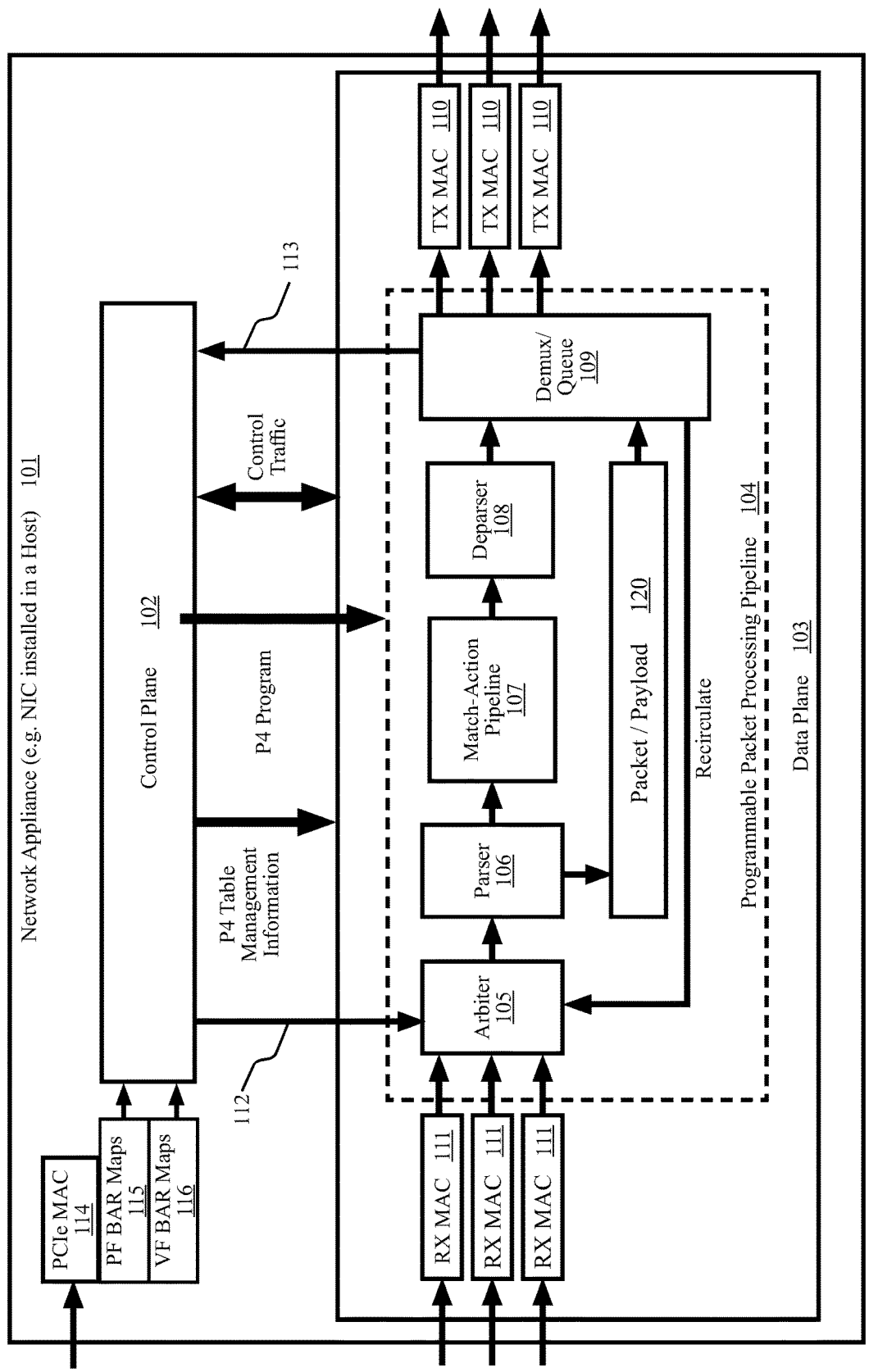
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Low latency data transfer is one of the important considerations for many network traffic flows such as for storage access and for certain internet protocol (IP) traffic. Storage access often uses protocols such as InfiniBand RDMA or non-volatile memory express over fabric (NVMe-oF). Typical data center deployments may use network interface cards (NICs) that also implement InfiniBand channel adapters and NVMe-oF cards. As such, the NICs must service thousands, possibly millions, of data transfer queues. The data transfer queues can include ethernet transmit queues, InfiniBand send queues, and NVMe submission queues. Typically, the NIC will round robin across the data transfer queues, thereby ensuring fairness across different applications and data-transfers. The rate at which work is posted by applications to the data transfer queues varies. At any instance of time, some applications might be posting work at a high-rate, keeping some data transfer queues full, while others post work at a very slow rate. Many applications can be classified as high bandwidth or as low latency. High bandwidth applications are typically resilient to latency variations and are tolerant of high latency (within reason). Low latency applications typically send small amounts of traffic but require that traffic to be delivered quickly. Some applications switch between a high bandwidth mode and a low latency mode. At any instance of time, low latency and high bandwidth applications both wait in long wait queues as a round robin scheduler processes the wait queue and schedules data transfer operations. Such scenarios adversely affect the latency of the data transfer queues, thereby penalizing the applications posting work at a slower rate. One attempted solution has been to implement hardware based DWRR (deficit weight round robin) schedulers with weights assigned to each data transfer queue based on bandwidth usage. Such solutions doesn't scale well for millions of data transfer queues.

A solution that does scale to millions of data transfer queues assigns the data transfer queues to scheduler priority classes and can move a data transfer queues from one scheduler priority class to another based on workload, bandwidth used, queue depth, last serviced time, or some other factor. Each data transfer queue can be assigned to an initial class. For example, every data transfer queue can initially be assigned to a default class or can be assigned to a scheduler priority class based on a bandwidth requirement, an SLA (service level agreement) with a tenant of the data center, an application associated with data transfer queue, etc. A very simple scheduler can select data transfer operations from each scheduler priority class. For example, a very fast and simple scheduler can be a loop selecting ten from the highest priority class, four from a middle priority class, and one from a lowest priority class. Assigning a data transfer queue from one class to another class can be performed in the data plane in conjunction with a data transfer operation for that queue. As such, the scheduler priority of a data transfer queue may only be evaluated when a data transfer operation for data transfer queue is being processed.

One of the main advantages of the solution described is that it scales to millions of data transfer queues. The priority evaluation operation for a data transfer queue can be performed in the data plane and can use information that is immediately available in the data plane because a data transfer operation for the data transfer queue is performed in conjunction with the priority evaluation operation. Performing the operations in conjunction thereby uses information that is briefly and immediately available in the data plane, often within the packet processing pipeline. Priority evaluation operations that are performed separately would require the data to be saved to memory or to be recalculated, thereby slowing operation.

In the field of data networking, the functionality of network appliances such as switches, routers, and network interface cards (NICs) are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O and InfiniBand traffic flows, extremely quickly if the match-action pipeline is configured to process those traffic flows. Upon receiving a packet of a network traffic flow, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match-action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniB and channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MACs 111 implement media access control on incoming packets via, for example, a MAC protocol such as Ethernet. The MAC protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 110 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 1, a P4 program is provided to the data plane 103 via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector or "PHV." The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, InfiniBand PDUs, etc.) as determined by the match-action pipeline. In some cases, a packet/payload may travel in a separate queue or buffer 120, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 105 for additional processing.

A NIC 101 can have a peripheral component interconnect extended (PCIe) interface such as PCIe media access control (MAC) 114. A PCIe MAC can have a base address register (BAR) at a base address in a host system's memory space. Processes, typically device drivers within the host system's operating system, can communicate with the NIC via a set of registers beginning with the BAR. Some PCIe devices are single root input output virtualization (SR-IOV) capable. Such PCIe devices can have a physical function (PF) and multiple virtual functions (VFs). A PF BAR map 115 can be used by the host machine to communicate with the PCIe card. A VF BAR map 116 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniB and channel adapter via another PF. As such, the NIC can provide "NIC" VFs and "InfiniBand" VFs to VMs running on the host. The InfiniBand PF and VFs can be used for data transfers, such as RDMA transfers to other VMs running on the same or other host computers. Similarly, the NIC can provide NVMe and SCSI PFs and VFs to VMs running on the host.

Figure 2:
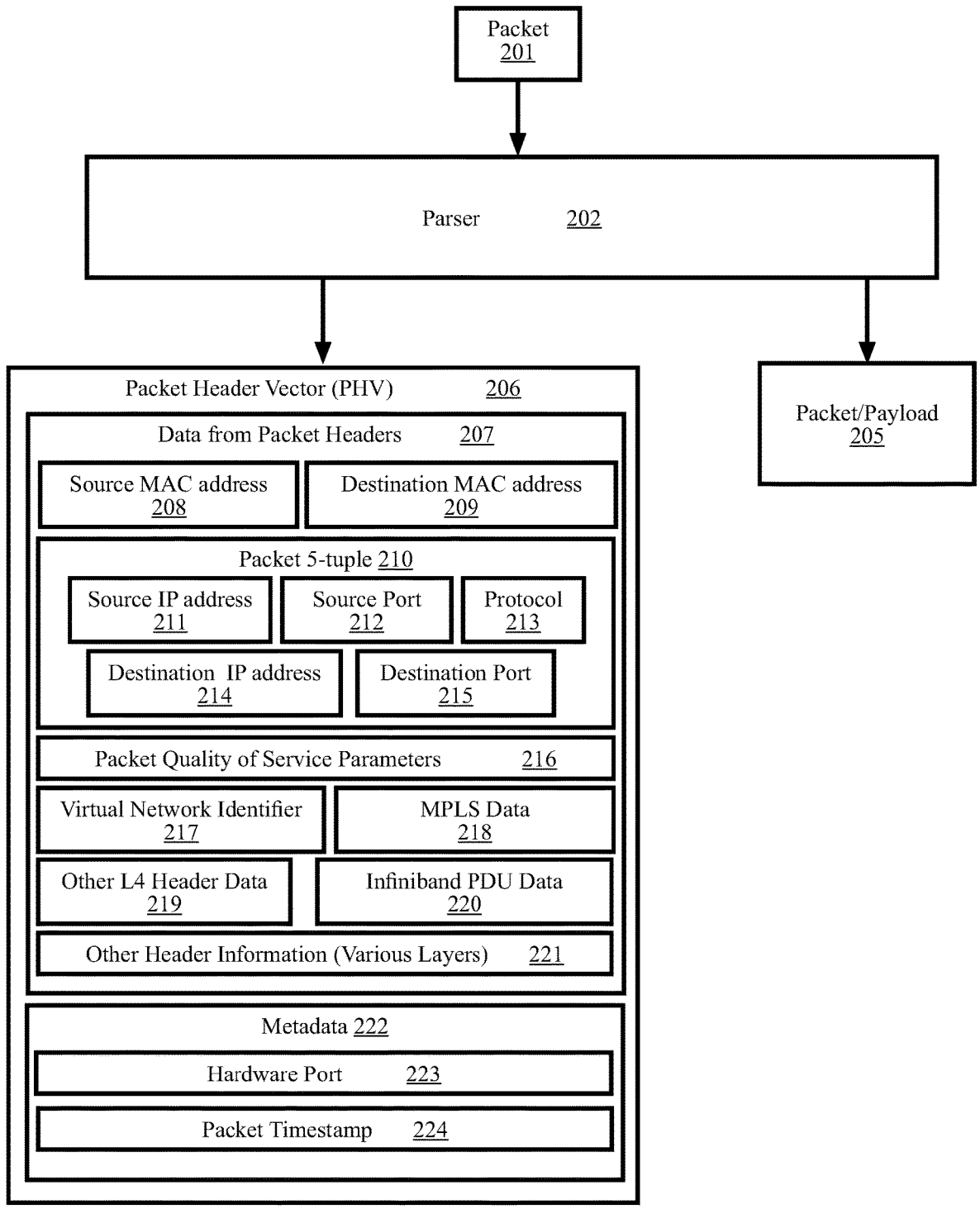
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The InfiniB and PDU (protocol data unit) data 220 can be obtained from an InfiniB and PDU contained in, for example, a layer 4 payload. The InfiniBand PDU data can include an identifier for a destination queue pair, an opcode (e.g. RDMA opcode), a virtual memory address, a memory key, a code key, and other data transported in InfiniBand PDUs. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in protocols such as InfiniB and realize that the data packets communicated among InfiniBand consumers also have well defined and standardized formats. As such, InfiniB and packets, PDUs, and packet headers can be easily created and processed by a programmable data plane such as the data plane of a P4 programmable NIC. Specifically, the parser can parse InfiniB and packets and PDUs, the match-action pipeline can process InfiniBand packets and PDUs, the deparser can assemble InfiniBand packets and PDUs, the demux/queue can assemble InfiniBand packets and PDUs, and the network appliance or NIC can send and receive InfiniBand packets and PDUs.

Those practiced in protocols such as NVMe/TCP realize that NVMe data packets also have well defined and standardized formats. As such, NVMe/TCP packets, PDUs, and packet headers can be easily created and processed by a programmable data plane such as the data plane of a P4 programmable NIC. Specifically, the parser can parse NVMe packets and PDUs, the match-action pipeline can process NVMe packets and PDUs, the deparser can assemble NVMe packets and PDUs, the demux/queue can assemble NVMe packets and PDUs, and the network appliance or NIC can send and receive NVMe packets and PDUs.

Figure 3:
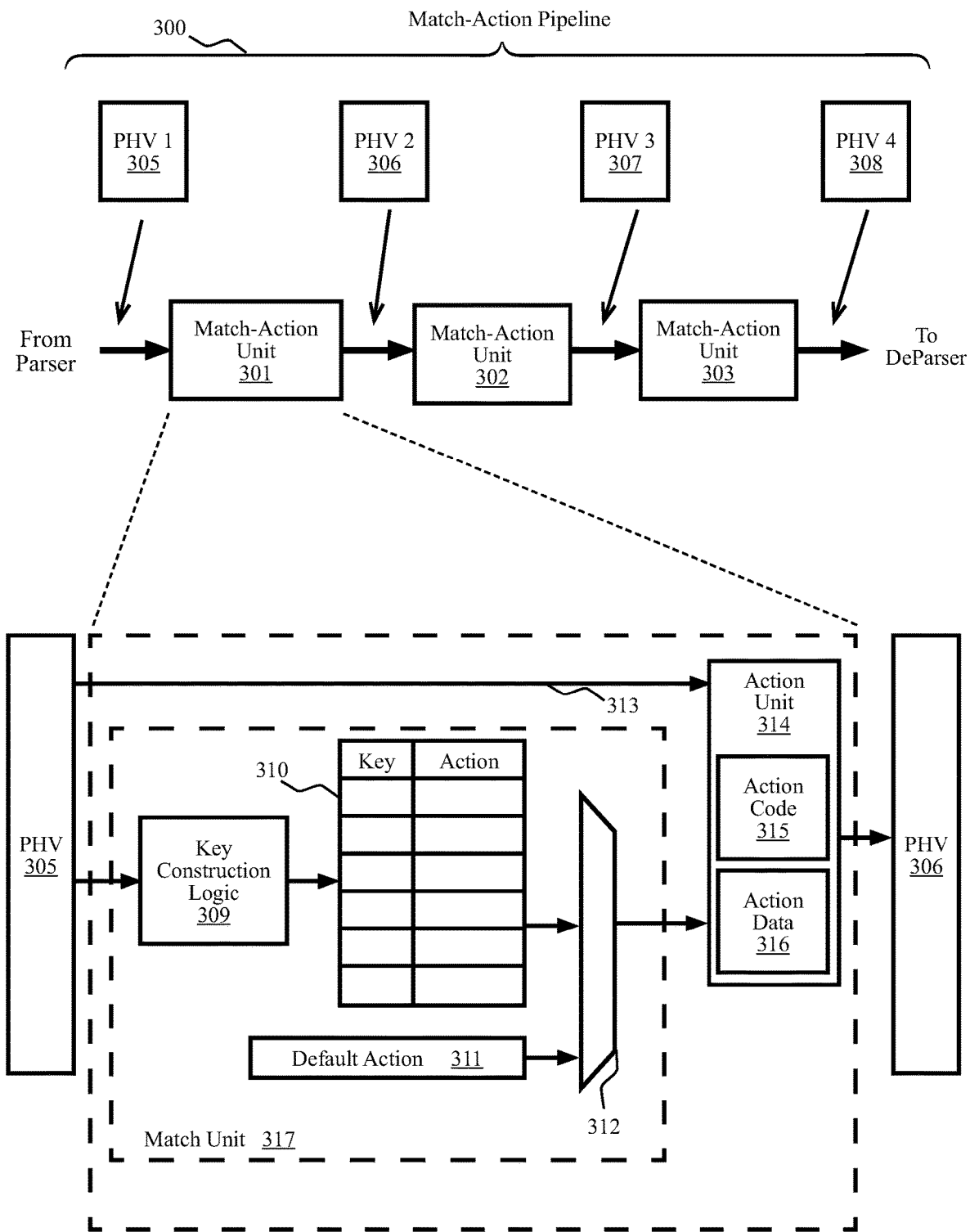
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 305 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g. 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. The operations of the match-action unit can be programmable by the control plane via P4 and the contents of the lookup table are managed by the control plane.

Figure 4:
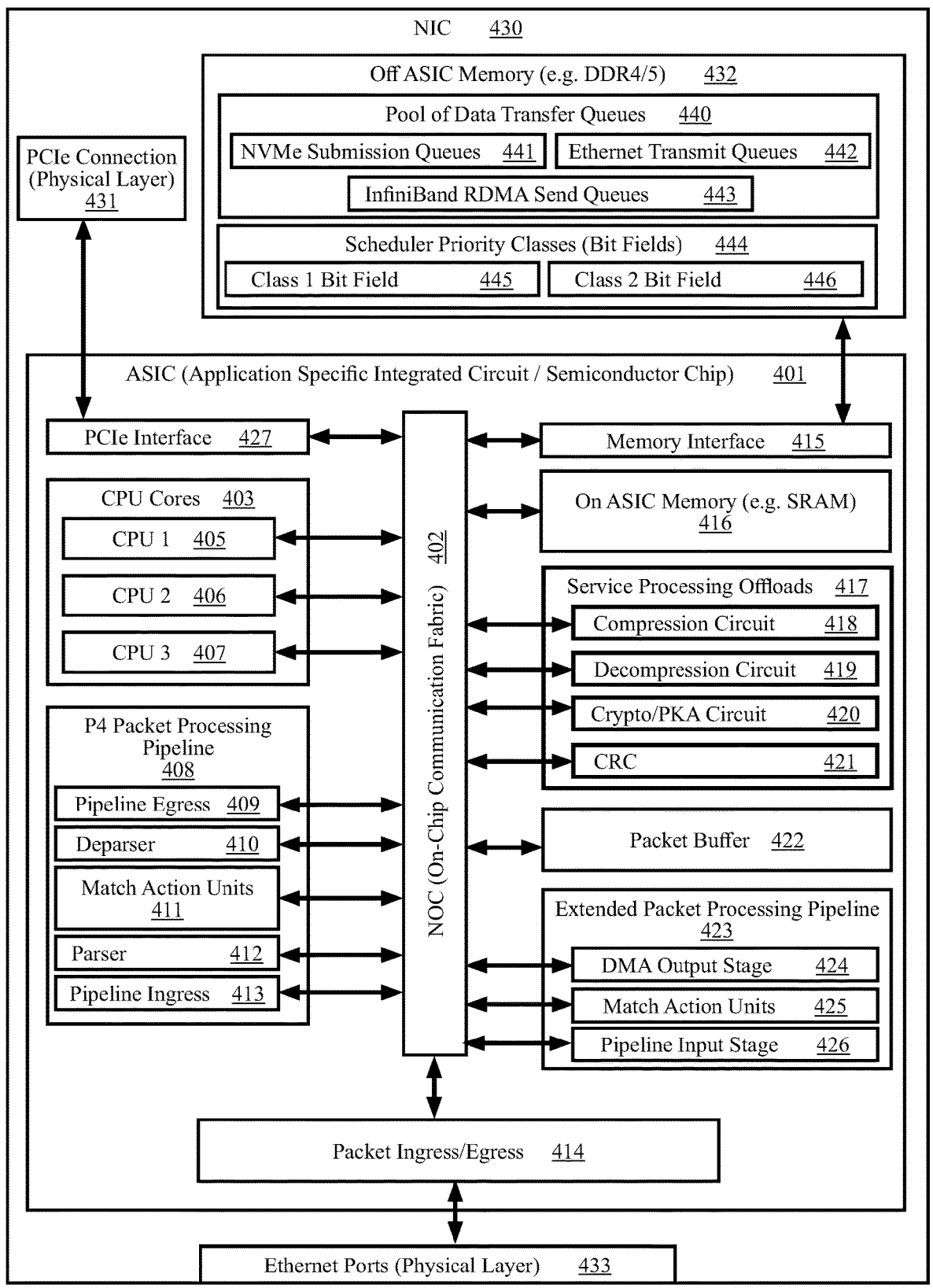
FIG. 4 is a functional block diagram of a NIC (network interface card) having an ASIC (application specific integrated circuit), according to some aspects.

FIG. 4 is a functional block diagram of a NIC 430 having an application specific integrated circuit (ASIC) 401, according to some aspects. The NIC can be installed in a host computer and can act as a network appliance for the host computer. The NIC 430 includes a PCIe connection 431, off ASIC memory 432, and ethernet ports 433. The PCIe connection provides for installing the NIC in a host computer having a PCIe bus. The off ASIC memory 432 can be one of the widely available memory modules or chips such as double data rate 4 (DDR4) synchronous dynamic random-access memory (SDRAM) such that the ASIC has access to many gigabytes of memory on the NIC 430. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g. SRAM) 416, service processing offloads 417, a packet buffer 422, extended packet processing pipeline 423, and packet ingress/egress circuits 414. The PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP (internet protocol) packets and InfiniBand PDUs (protocol data units). The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is currently defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The NIC 430 can include a memory 432 for running Linux or some other operating system, for data transfer queues 440, for scheduler priority classes 444, for storing executable code, for storing large data structures such as flow tables and other analytics, and for providing buffering resources for advanced features including TCP termination and proxy, deep packet inspection, storage offloads, and connected FPGA functions. The data transfer queues 440 can include NVMe submission queues 441, ethernet transmit queues 442, and InfiniBand RDMA send queues 443. The scheduler priority classes 444 can be or include bitfields such as class 1 bit field 445 and class 2 bit field 446.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path. A network appliance having two data paths has a fast data path and a slow data path when one of the data paths processes packets faster than the other data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline such as match-action pipeline 300. The extended packet processing pipeline has a pipeline input stage 426 that can receive PHVs or directives to perform operations. For example, data in the PHV can indicate that the PHV is a directive for implementing an RDMA operation. The key construction logic 309 of the MPUs can use the data to form a key that indexes into a lookup table 310 to locate an action. The MPUs can thereby execute actions such that the DMA output stage 424 writes InfiniB and PDU payload data into the off ASIC memory 432 or into the host memory.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
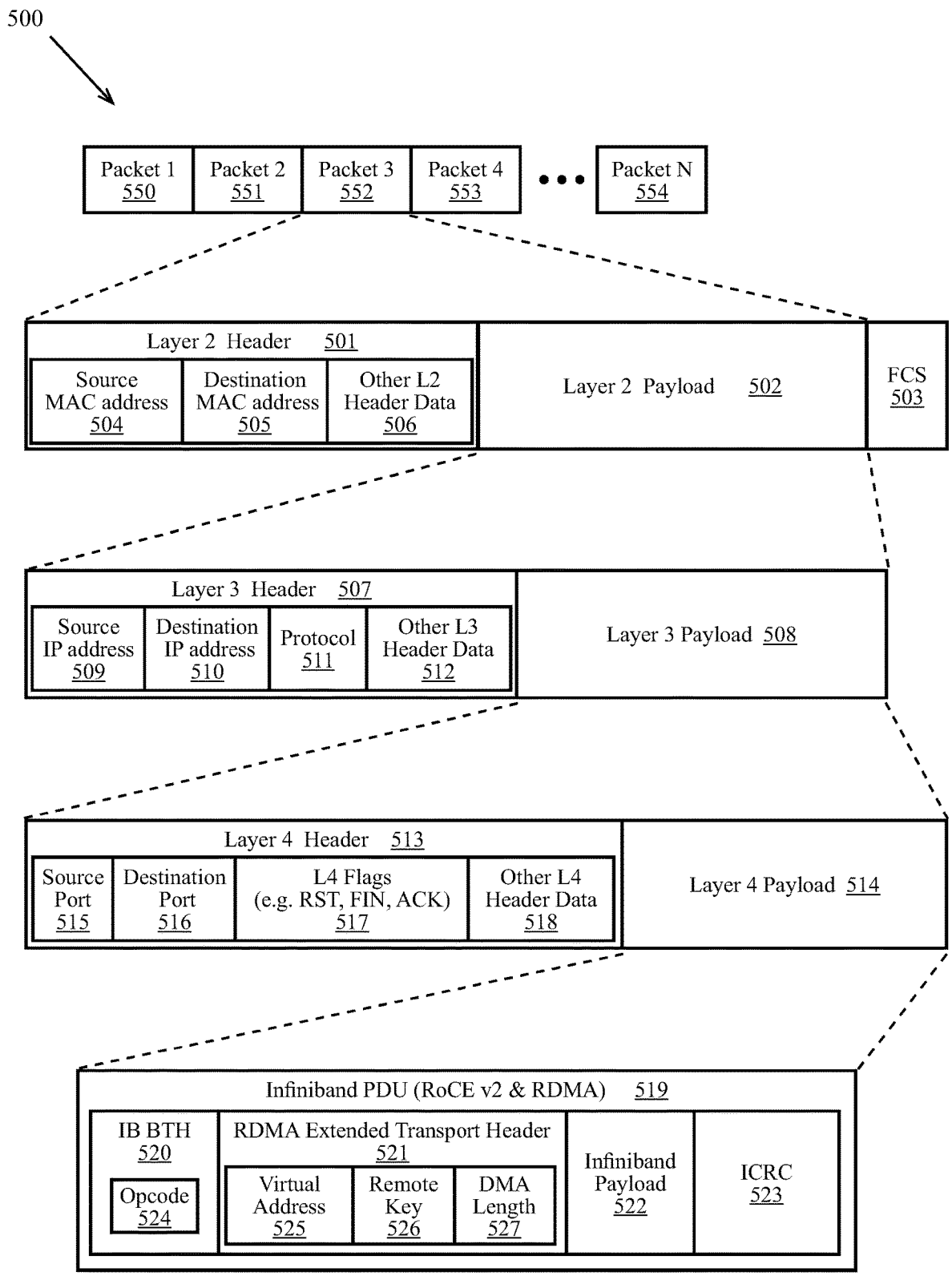
FIG. 5 illustrates packet headers and payloads of packets for network traffic flows including InfiniBand PDUs according to some aspects.

FIG. 5 illustrates packet headers and payloads of packets for network traffic flows 500 including InfiniBand PDUs according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 501, a layer 2 payload 502, and a layer 2 frame check sequence (FCS). The layer 2 header can contain a source MAC address 504, a destination MAC address 505, and other layer 2 header data 506. The input ports 111 and output ports 110 of a network appliance 101 can have MAC addresses. A network appliance 101 can have a MAC address that is applied to all or some of the ports. Alternatively, a network appliance may have one or more ports that each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a Layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RoCE v2 (RDMA over Converged Ethernet version 2), HTTP (Hypertext Transfer Protocol), FTP (File Transfer Protocol), SMTP (Simple Mail Transfer Protocol), and DHCP (Dynamic Host Configuration). Data coded according to application layer protocols can be encapsulated into transport layer protocol units (such as TCP or UDP messages), which in turn use lower layer protocols to effect actual data transfer.

A layer 4 payload may include a layer 7 packet. A layer 7 packet may be an InfiniBand PDU 519 having an InfiniBand BTH (base transport header) 520, RDMA extended transport header 521, InfiniBand payload 522, and ICRC (invariant cyclic redundancy check) 523. The BTH 520 can include the destination QP (queue pair), the operation code 524, packet sequence number, and partition. The RDMA extended transport header 521 contains data fields for RDMA operations such as a virtual address 525, a remote key 526, and a DMA length 527. The remote key can identify a memory region in a remote host. The virtual address 525 can be mapped to a physical address in the memory region. The DMA length can indicate the length, in bytes, of the DMA operation. The ICRC 523 is a CRC covering the fields in the PDU that do not change from the source to the destination.

Figure 6:
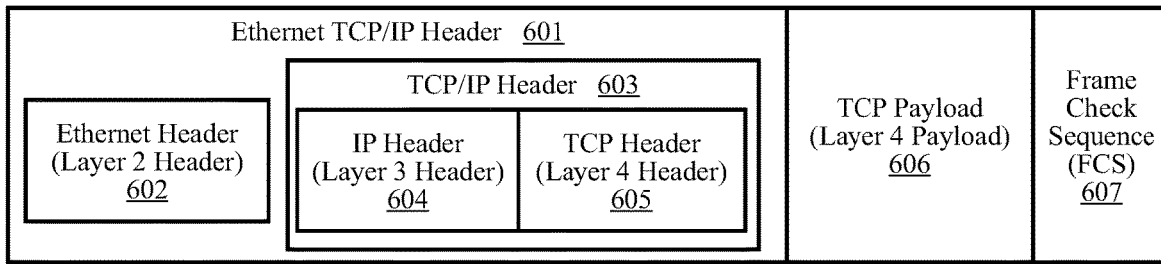
FIG. 6 illustrates an ethernet TCP/IP packet according to some aspects.

FIG. 6 illustrates an Ethernet TCP/IP packet according to some aspects. Ethernet packets, such as Ethernet TCP/IP packets, have an Ethernet header 602 and a frame check sequence (FCS) 607. As discussed above, Ethernet is a layer 2 protocol. An Ethernet TCP/IP header 601 has an Ethernet header 602 and a TCP/IP header 603. The TCP/IP header 603 has an IP header 604 and a TCP header 605. The Ethernet TCP/IP packet has a TCP payload 606 as the layer 4 payload.

Figure 7:
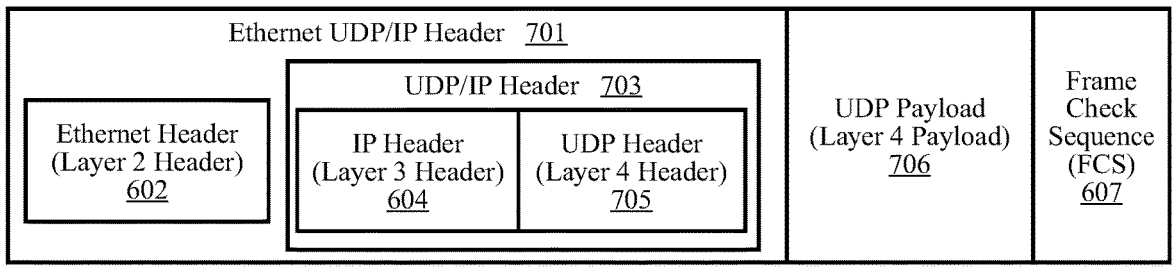
FIG. 7 illustrates an ethernet UDP/IP packet according to some aspects.

FIG. 7 illustrates an ethernet UDP/IP packet according to some aspects. An Ethernet UDP/IP packet differs from an Ethernet TCP/IP packet by having UDP as the layer 4 protocol. Ethernet UDP/IP packets, have an Ethernet header 602 and a frame check sequence (FCS) 607. An Ethernet UDP/IP header 701 has an Ethernet header 602 and a UDP/IP header 703. The UDP/IP header 703 has an IP header 604 and a UDP header 705. The Ethernet UDP/IP packet has a UDP payload 706 as the layer 4 payload.

Figure 8:
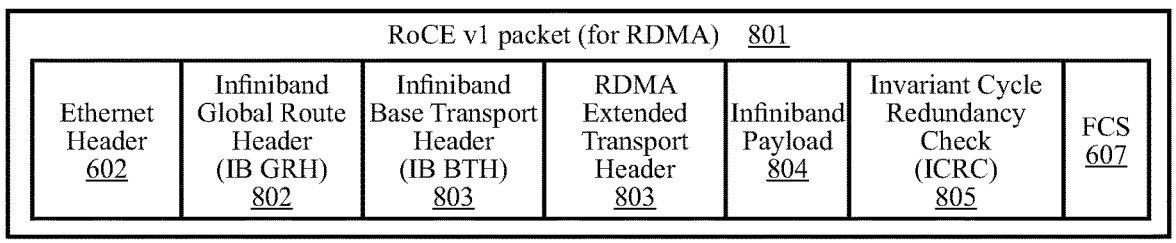
FIG. 8 illustrates a RoCE v1 (RDMA over converged ethernet, version 1) packet according to some aspects.

FIG. 8 illustrates a RoCE v1 (RDMA over converged ethernet, version 1) packet 801 according to some aspects. The format of RoCE v1 packets 801 is specified in "The InfiniB and Architecture Specification Volume 1, Release 1.4" published by the InfiniBand Trade Association on Apr. 7, 2020 ("the InfiniBand Specification"). The RoCE v1 packet 801 can be seen to be an ethernet packet having an Ethernet payload that includes an InfiniB and Global Route Header (IB GRH) 802, an InfiniBand Base Transport Header (IB BTH) 803, an RDMA extended transport header 804, an InfiniB and payload 805, and an Invariant Cyclic Redundancy Check (ICRC) 806 field.

Figure 9:
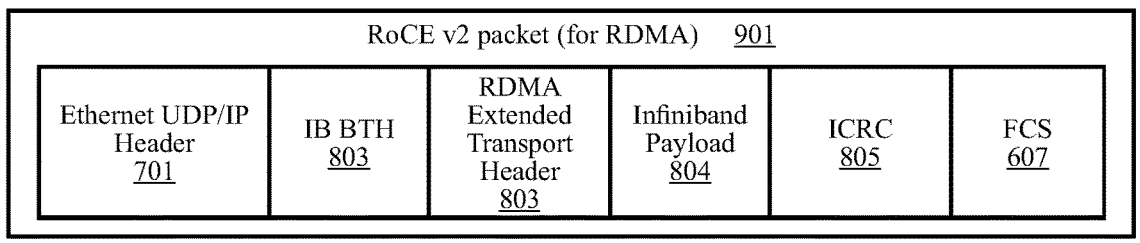
FIG. 9 illustrates a RoCE v2 (RDMA over converged ethernet, version 2) packet according to some aspects.

FIG. 9 illustrates a RoCE v2 (RDMA over converged ethernet, version 2) packet 901 according to some aspects. The format of RoCE v2 packets 901 is specified in the InfiniBand Specification. The RoCE v2 packet 901 can be seen to be an Ethernet UDP/IP packet having a UDP payload that includes an IB BTH 803, an RDMA extended transport header 804, an InfiniBand payload 805, and an ICRC 806. Here, Ethernet is the layer 2 transport for a UDP packet carrying the InfiniBand elements. Other layer 2 protocols may be used as the layer 2 transport.

Figure 10:
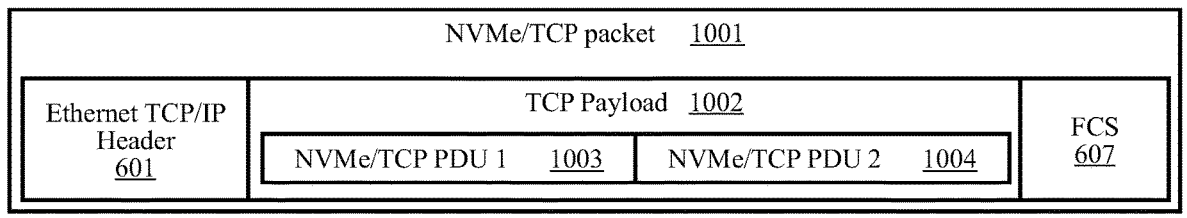
FIG. 10 illustrates a single TCP/IP packet having a TCP payload that includes multiple NVMe/TCP PDUs according to some aspects.
Figure 11:
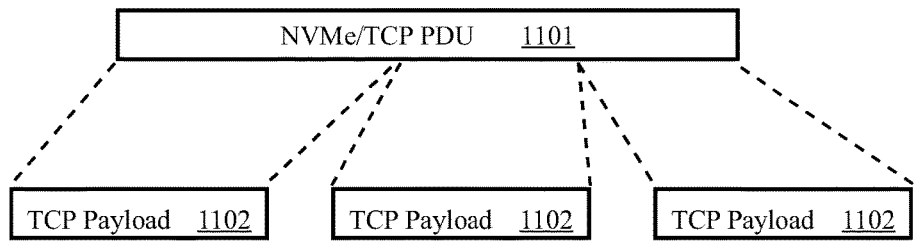
FIG. 11 illustrates a single NVMe/TCP PDU carried by multiple TCP packets according to some aspects.

FIGS. 10-11 illustrate the TCP payloads of NVME/TCP packets. FIG. 10 illustrates a single TCP/IP packet 1001 having a TCP payload 1002 that includes multiple NVMe/TCP PDUs according to some aspects. TCP/IP payload 1002 includes NVMe/TCP PDU 1 1003 and NVMe/TCP PDU 2 1004. FIG. 11 illustrates a single NVMe/TCP PDU 1101 carried by multiple TCP packets according to some aspects. Multiple TCP payloads 1102 of multiple TCP packets carry the NVMe/TCP PDU 1101.

Figure 12:
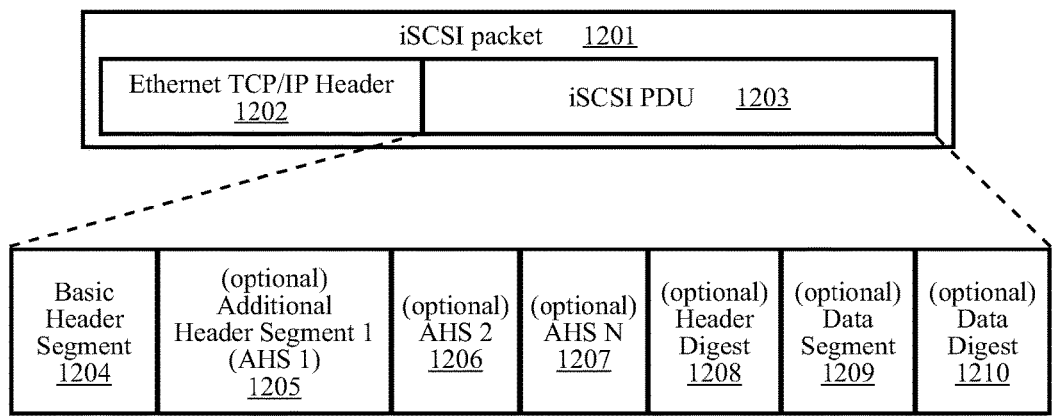
FIG. 12 illustrates an iSCSI packet having an Ethernet TCP/IP header and an iSCSI PDU according to some aspects.

FIG. 12 illustrates an iSCSI packet 1201 having an Ethernet TCP/IP header 1202 and an iSCSI PDU 1203 according to some aspects. The IETF (Internet Engineer Task Force) is a consortium that develops and publishes standards for the Internet in the form of RFCs (requests for comment). The iSCSI packet format is specified in IETF RFC 7143 titled "Internet Small Computer System Interface (iSCSI) Protocol", published in April, 2014. The iSCSI PDU 1203 can contain a basic header segment 1204, a first AHS (additional header segment) 1205, a second AHS 1206, an Nth AHS 1207, a header digest 1208, a data segment 1209, and a data digest 1210.

Figure 13:
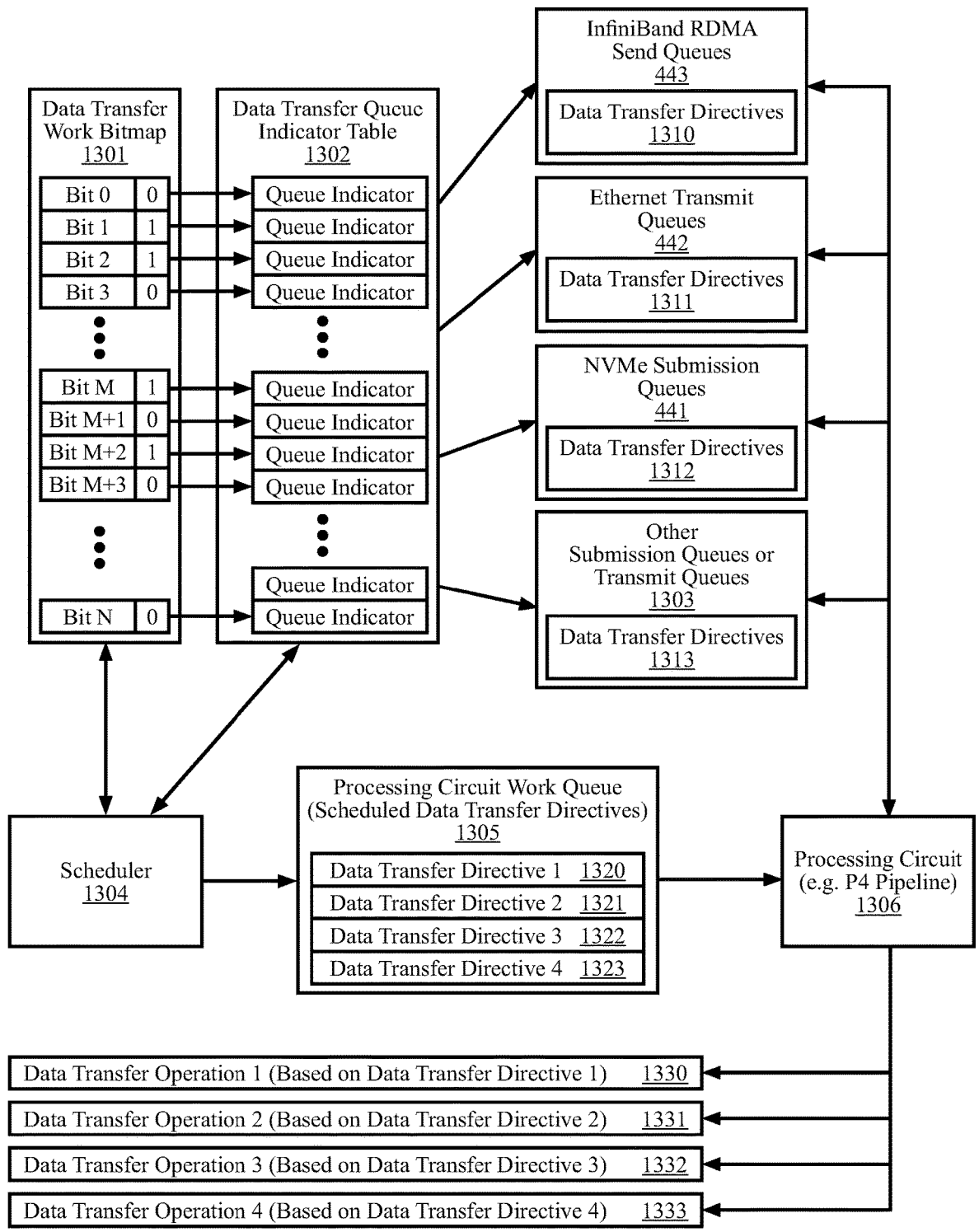
FIG. 13 is a high-level block diagram illustrating the scheduling and performance of data transfer operations according to some aspects.

FIG. 13 is a high-level block diagram illustrating the scheduling and performance of data transfer operations according to some aspects. A network appliance, such as NIC 430, can have thousands or millions of data transfer queues. The data transfer queues can be numbered from 0 to N. A sixteen bit queue number can indicate that the network appliance has up to 65,536 data transfer queues. A twenty bit queue number can indicate that the network appliance has up to 1,048,576 data transfer queues. A twenty one bit queue number can indicate that the network appliance has up to 2,097,152 data transfer queues. The data transfer queues can include InfiniBand RDMA send queues 443, ethernet transmit queues 442, NVMe submission queues 441, and other submission queues or transmit queues 1303. An InfiniBand RDMA send queue 443 can include data transfer directives 1310. An ethernet transmit queue 442 can include data transfer directives 1311. A NVMe submission queue 441 can include data transfer directives 1312. Other submission queue or transmit queues 1303 can include data transfer directives 1313. A data transfer directive can include data that specifies a data transfer operation such as the type of operation, the data to be transferred, etc.

The locations of the data transfer queues can be indicated by a data transfer queue indicator table 1302 that contains numerous queue indicators. Each queue indicator may be a pointer indicating a data transfer queue location in the network appliance's (e.g. the NIC's) memory. The data transfer work bitmap 1301 can indicate which data transfer queues have work that can be scheduled. A scheduler 1304 can use the data transfer work bitmap to rapidly determine which data transfer queues have work. For example, in FIG. 13, bit M of the data transfer work bitmap is set, thereby indicating that data transfer queue M has work. The scheduler can follow the queue indicator at position M in data transfer queue indicator table 1302 to data transfer queue M. The scheduler can then take a data transfer directive from data transfer queue M and place it in the processing circuit work queue 1305. Note that the scheduler could step through the data transfer queue indicator table 1302 and check each data transfer queue for work. Such a process is far slower than the illustrated process that uses a bitmap. A data transfer directive may be dequeued from a data transfer queue, preprocessed or modified, and then placed on the processing circuit work queue 1305. For example, the network appliance may have multiple processing circuits processing the data transfer directives and, as such, the scheduled data transfer directive may be modified for execution by a particular one of the processing circuits.

The processing circuit work queue 1305 is a queue of scheduled data transfer directives such as data transfer directive 1 1320, data transfer directive 2 1321, data transfer directive 3 1322, and data transfer directive 4 1323. The processing circuit 1306 can perform data transfer operations based on the scheduled data transfer directives. Data transfer operation 1 1330 is based on data transfer directive 1 1320. Data transfer operation 2 1331 is based on data transfer directive 2 1321. Data transfer operation 3 1332 is based on data transfer directive 3 1322. Data transfer operation 4 1333 is based on data transfer directive 4 1323. The specific data transfer operation can be specified by the data transfer directive. As such, the data transfer operations 1330, 1331, 1332, 1333 may be a mix of InfiniBand, ethernet, NVMe, and other data transfer operations.

Figure 14:
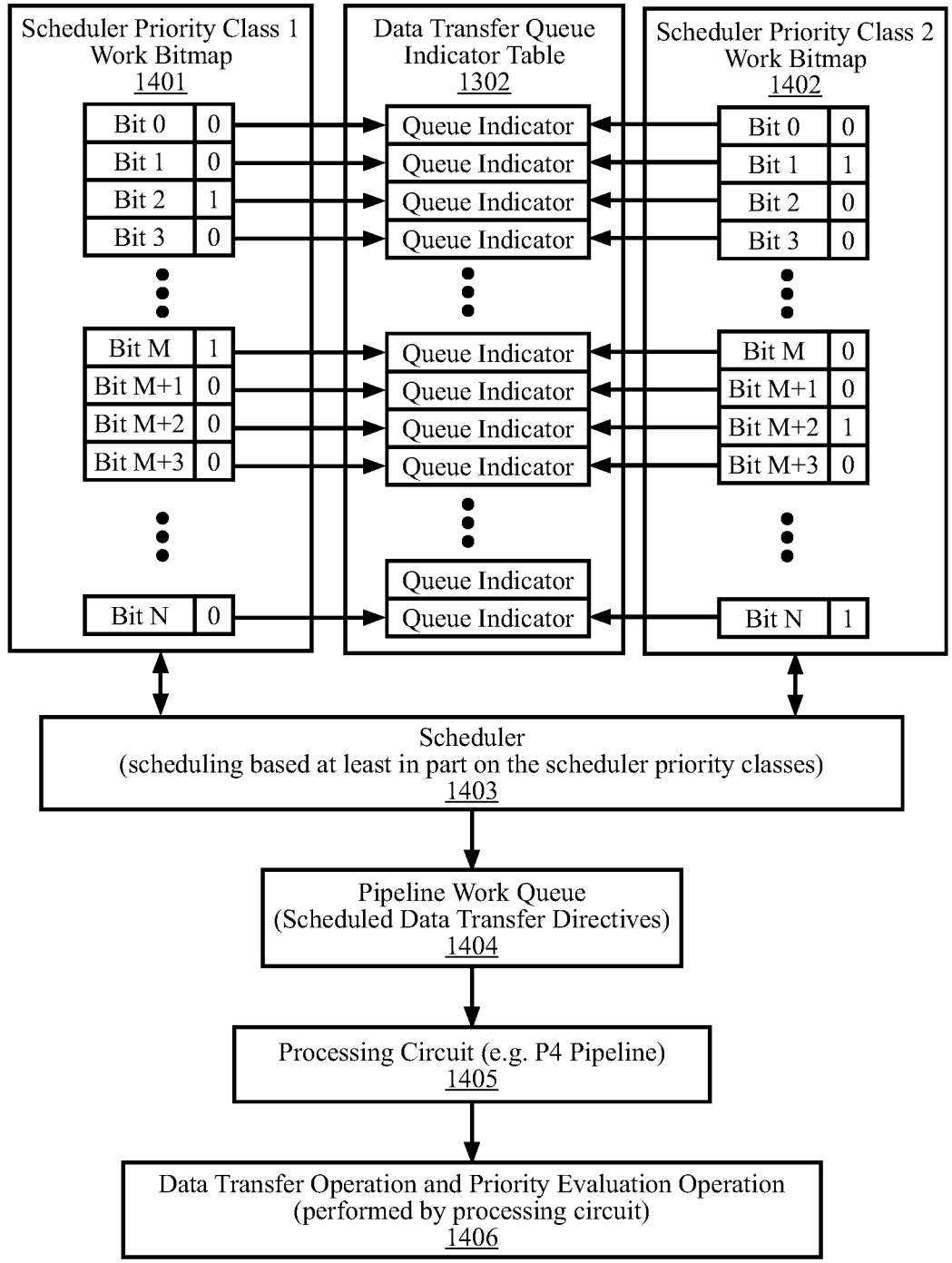
FIG. 14 is a high-level block diagram illustrating the scheduling and performance of data transfer operations for multiple scheduler priority classes according to some aspects.

FIG. 14 is a high-level block diagram illustrating the scheduling and performance of data transfer operations for multiple scheduler priority classes according to some aspects. Data transfer queues having work in scheduler priority class 1 are indicated by the scheduler priority class 1 work bitmap 1401. Data transfer queues having work in scheduler priority class 2 are indicated by the scheduler priority class 2 work bitmap 1402. The scheduler can schedule data transfer operations based at least in part on the scheduler priority classes. For example, the scheduler 1403 can use the scheduler priority class 1 work bitmap 1401 to find and schedule a data transfer operation having scheduler priority class 1. Similarly, the scheduler 1403 can use the scheduler priority class 2 1402 work bitmap to find and schedule a data transfer operation having scheduler priority class 2. The scheduler 1403 can queue the scheduled data transfer directives on the pipeline work queue 1404. The processing circuit 1405 (e.g. P4 packet processing pipeline 408) can perform data transfer operations based on the scheduled data transfer directives. The processing circuit can also perform a priority evaluation operation in conjunction with performing the data transfer operation. For example, the data transfer directive can be from data transfer queue M. In conjunction with performing the data transfer operation for data transfer queue M, the processing circuit also evaluates the priority of data transfer queue M via a priority evaluation operation 1406. As such, data transfer queue M may be assigned from scheduler priority class 1 to scheduler priority class 2 or may be assigned from scheduler priority class 2 to scheduler priority class 1. In this manner, priority evaluation is off loaded from the CPUs to the processing circuit and is accelerated by the processing circuit.

Figure 15:
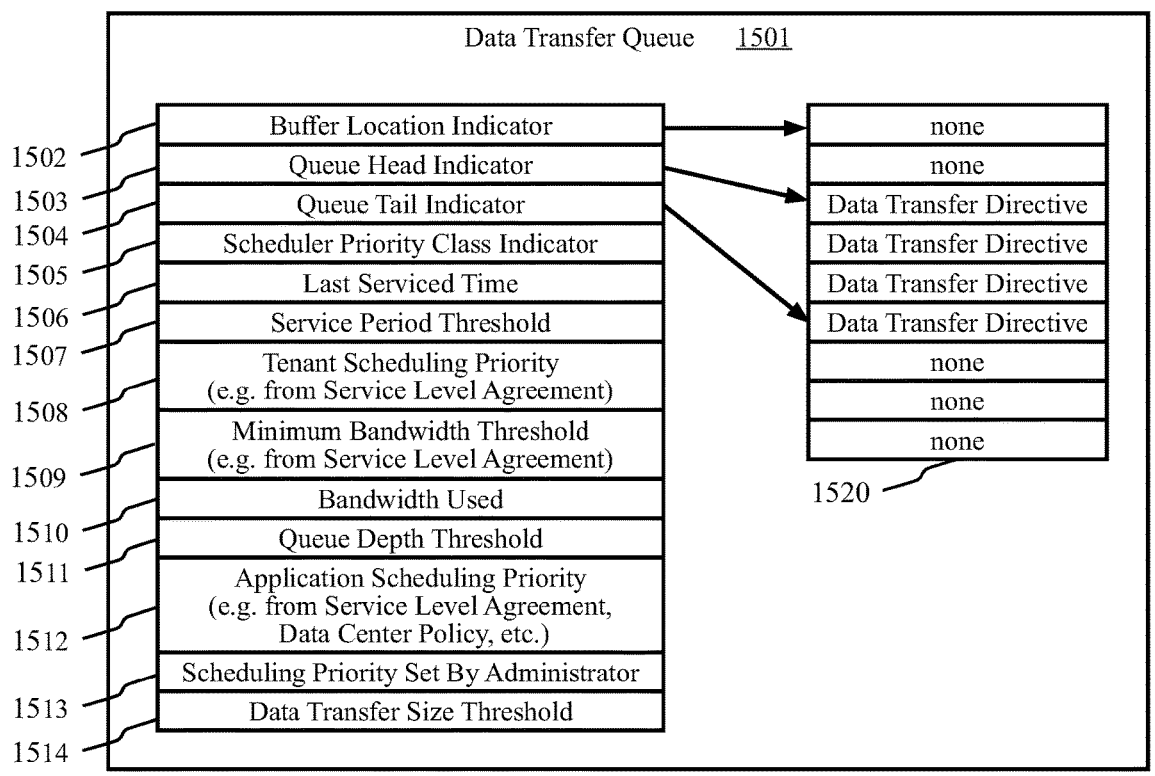
FIG. 15 illustrates a non-limiting example of a data transfer queue 1501 according to some aspects.

FIG. 15 illustrates a non-limiting example of a data transfer queue 1501 according to some aspects. The data transfer queue 1501 can include status variables and a buffer 1520 for holding data transfer directives. The status variables can include a buffer location indicator 1502, a queue head indicator 1503, a queue tail indicator 1504, a scheduler priority class indicator 1505, a last serviced time 1506, a service period threshold 1507, a tenant scheduling priority 1508, a minimum bandwidth threshold 1509, a bandwidth used 1510, a queue depth threshold 1511, an application scheduling priority 1512, a scheduling priority set by an administrator 1513, and a data transfer size threshold 1514.

The buffer location indicator 1502 can be a pointer to the buffer location in memory. The queue head indicator 1503 can indicate the next data transfer directive that should be scheduled and moved to the work queue. The scheduler can schedule the data transfer directive indicated by the head indicator. The head indicator can then be moved to indicate the next data transfer directive in the data transfer queue. The queue tail indicator 1504 can indicate the data transfer directive that was most recently queued on the data transfer queue. A new data transfer directive can be placed immediately after the tail and then the tail moved accordingly. The scheduler priority class indicator 1505 can indicate which scheduler priority class the data transfer queue is currently assigned to.

The last serviced time 1506 can be a timestamp indicating the most recent time at which the data transfer queue was serviced by the scheduler or, alternatively, by the packet processing pipeline. The service period threshold 1507 can indicate a threshold amount of time since last serviced, beyond which the data transfer queue may be moved to a different priority class. The tenant scheduling priority 1508 can be a value indicating an amount of scheduling favoritism provided to a tenant of a data center wherein the data transfer queue is associated with the tenant. The level of favoritism may be specified by an SLA (service level agreement) such as an agreement between the data center and a tenant contracting to use the resources of the data center. The minimum bandwidth threshold 1509 can indicate a minimum bandwidth that is to be provided to the data transfer queue before the data transfer queue is assigned a reduced priority. The bandwidth threshold may be specified by an SLA.

The bandwidth used 1510 is a measure of the bandwidth consumed by the data transfer queue's data transfer operations. The ASIC 401 of FIG. 4 is ideally suited for making such measurements because it processes each data transfer operation and can keep data transfer statistics in the memory. The queue depth threshold 1511 indicates a queue depth that, if exceeded, indicates that the data transfer queue may be getting starved and may need to be given greater priority. The application scheduling priority 1512 can be a value indicating an amount of scheduling favoritism provided to an application. The favoritism may be specified by an SLA, a data center policy, etc. The scheduling priority set by an administrator 1513 can be a value indicating an amount of scheduling favoritism set by an administrator. For example, a data center administrator may override all other favoritism mechanisms in order to diagnose issues or adapt to a situation. The data transfer size threshold 1514 can indicate a data transfer size beyond which the data transfer queue may be assigned a different priority.

The service period threshold 1507, the tenant scheduling priority 1508, the minimum bandwidth threshold 1509, the queue depth threshold 1511, the application scheduling priority 1512, and the data transfer size threshold 1514 can be metadata values associated with data transfer operations. The metadata values can indicate a tenant, a service level agreement, an application, etc.

Figure 16:
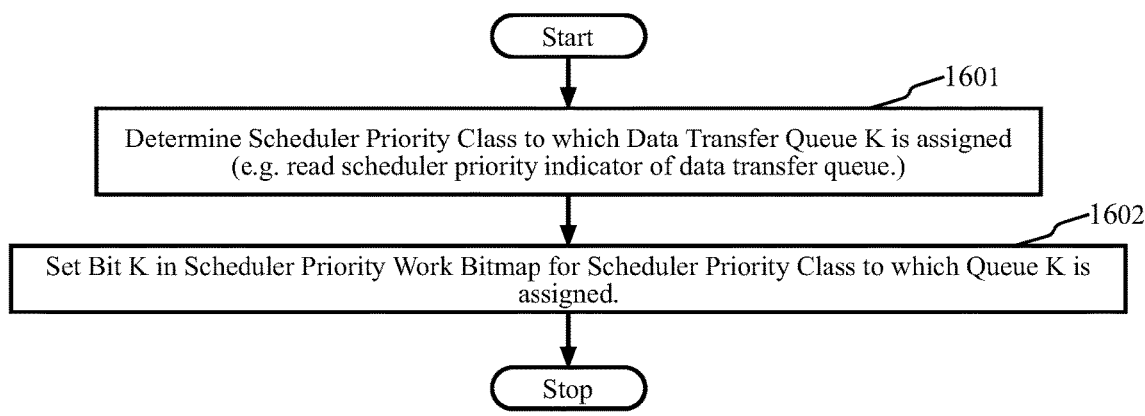
FIG. 16 is a high-level flow diagram of indicating work via a work bitmap according to some aspects.

FIG. 16 is a high-level flow diagram of indicating work via a work bitmap according to some aspects. When a data transfer directive is placed on a data transfer queue, a bit in a scheduler priority class bitmap should be set such that the scheduler schedules the associated transfer operation. For example, a data transfer directive can be placed in data transfer queue K. At block 1601, the scheduler priority class to which data transfer queue K is assigned is determined by, for example, checking scheduler priority class indicator 1505. At block 1602, bit K is set in the scheduler priority work bitmap for the scheduler priority class to which data transfer queue K is assigned.

Figure 17:
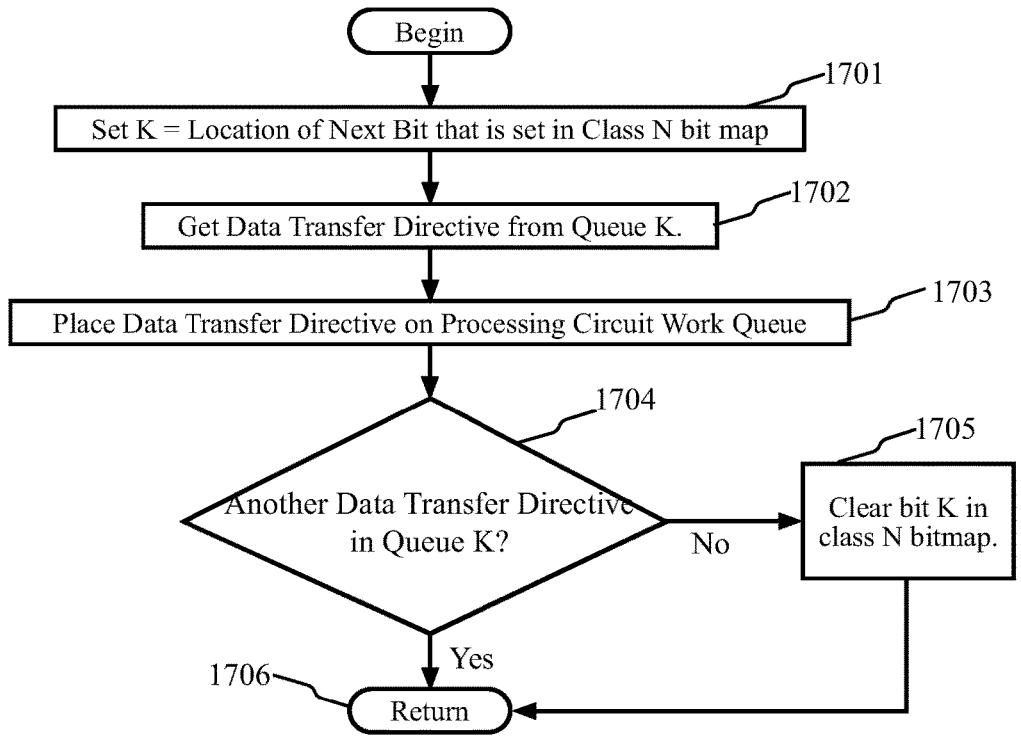
FIG. 17 is a high-level flow diagram of using a work bitmap to schedule a data transfer operation according to some aspects.

FIG. 17 is a high-level flow diagram of using a work bitmap to schedule a data transfer operation according to some aspects. The scheduler may implement a process similar to that shown in FIG. 17. The process schedules the next data transfer directive in the class N (e.g. scheduler priority class 1 or scheduler priority class 2) bitmap. The index of the previously serviced data transfer queue is tracked. For example, if the most recently serviced data transfer queue in class N is 585, then the "next" is indicated by the first bit after bit 585 that is set. At block 1701, the variable can be K is to the location of the next bit that is set in the class N bitmap (e.g. location 777). At block 1702, a data transfer directive is fetched from data transfer queue K (e.g. data transfer queue 777). At block 1703, the data transfer directive is placed on the work queue for the processing circuit. At block 1704, the process checks if data transfer queue K still has any queued data transfer directives. If yes, the process returns at block 1706 (the process of FIG. 17 is illustrated as a subroutine). Otherwise, at block 1705 the process clears bit K in the scheduler priority class N bitmap before returning at block 1706.

Figure 18:
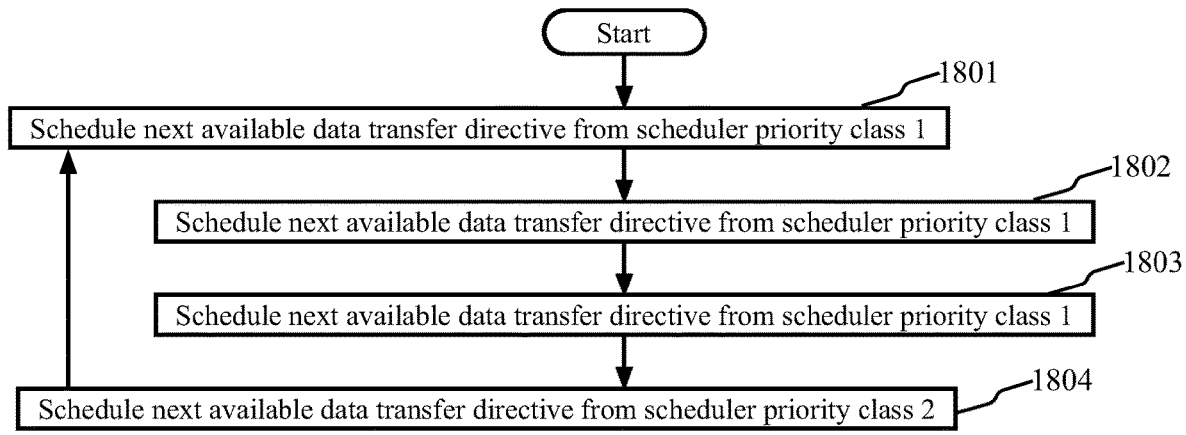
FIG. 18 is a high-level flow diagram illustrating a very simple and non-limiting process that schedules data transfer operations based on two scheduler priority classes according to some aspects.

FIG. 18 is a high-level flow diagram illustrating a very simple and non-limiting process that schedules data transfer operations based on two scheduler priority classes according to some aspects. The process of FIG. 18 schedules three data transfer operations from scheduler priority class 1, schedules one data transfer operation from scheduler priority class 2, and then repeats. Those practiced in the art know of many other scheduling algorithms such as weighted round robin, forcing scheduler priority class 2 to wait until there is no work in scheduler priority class 1, etc. At block 1801, the process schedules the next available data transfer directive from scheduler priority class 1. For example, the process of FIG. 18 can call the subroutine of FIG. 17 to schedule the next available data transfer directive from a scheduler priority class. At block 1802, the process schedules the next available data transfer directive from scheduler priority class 1. At block 1803, the process schedules the next available data transfer directive from scheduler priority class 1. At block 1804, the process schedules the next available data transfer directive from scheduler priority class 2 before looping back to block 1801.

Figure 19:
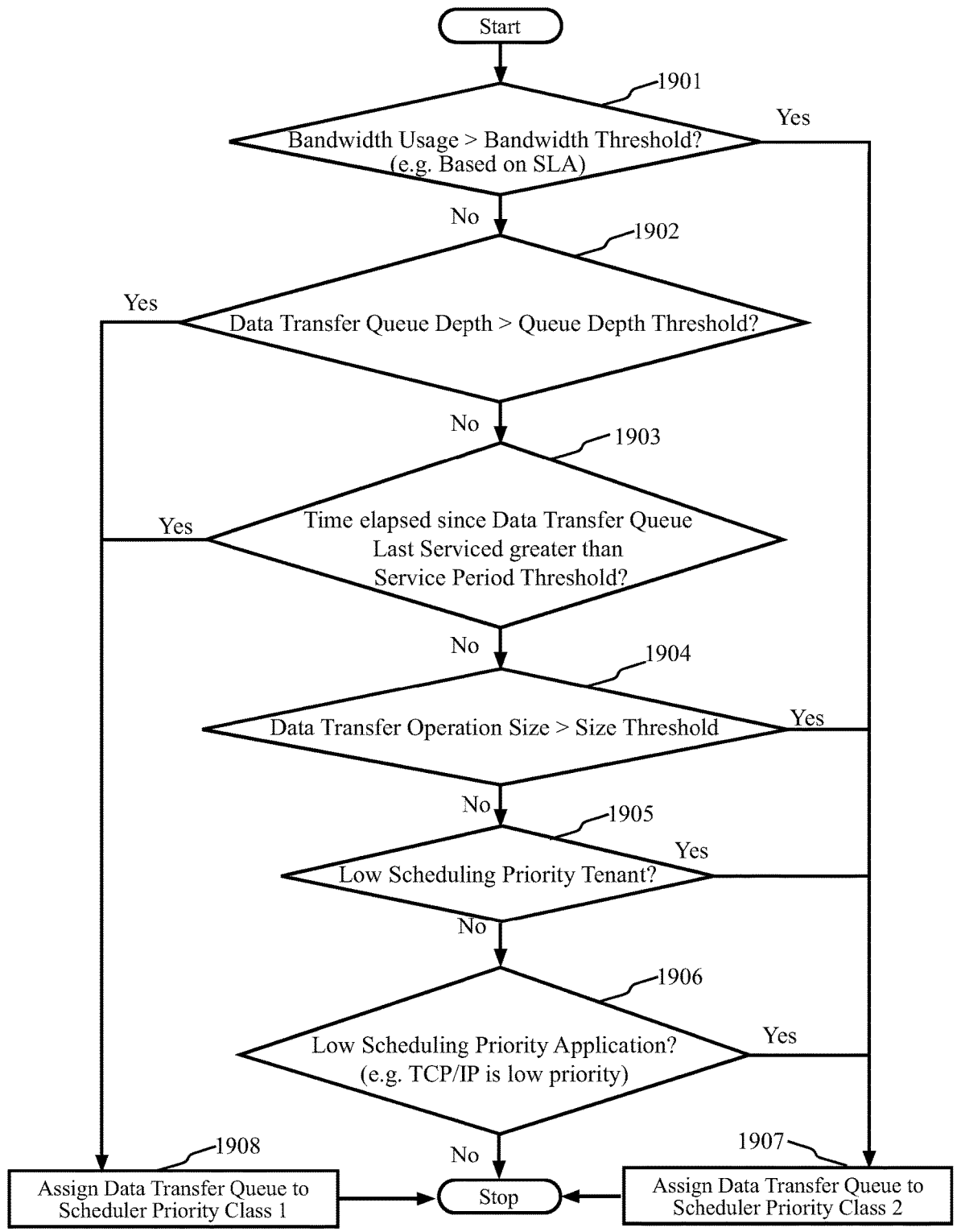
FIG. 19 is a high-level flow diagram illustrating a priority evaluation operation that can be performed in conjunction with a data transfer operation according to some aspects.

FIG. 19 is a high-level flow diagram illustrating a priority evaluation operation that can be performed in conjunction with a data transfer operation according to some aspects. At block 1901, the process checks if the bandwidth usage of the data transfer queue is greater than a bandwidth threshold. If yes, the process can assign the data transfer queue to scheduler priority class 2 at block 1907. If no, the process can move to block 1902. At block 1902, the process checks if the data transfer queue depth is greater than a queue depth threshold. If yes, the process can assign the data transfer queue to scheduler priority class 1 at block 1908. If no, the process can move to block 1903. At block 1903, the process checks if the time elapsed since the data transfer queue was last serviced is greater than a service period threshold. If yes, the process can assign the data transfer queue to scheduler priority class 1 at block 1908. If no, the process can move to block 1904. At block 1904, the process checks if the size of the data transfer operation is greater than a size threshold. If yes, the process can assign the data transfer queue to scheduler priority class 2 at block 1907. If no, the process can move to block 1905. At block 1905, the process checks if the data transfer queue is associated with a tenant having a low scheduling priority. If yes, the process can assign the data transfer queue to scheduler priority class 2 at block 1907. If no, the process can move to block 1906. At block 1906, the process checks if the data transfer queue is associated with an application having a low scheduling priority. If yes, the process can assign the data transfer queue to scheduler priority class 2 at block 1907. If no, the process can stop.

Note that at block 1903, if the data transfer queue hasn't been serviced for more than the threshold time then the data transfer queue gets a higher priority. A similar check can determine if the data transfer queue was service too recently (e.g. time elapsed since data queue last serviced less than minimum service period threshold). In such a case, the data transfer queue should be assigned scheduler priority class2.

At block 1905 and block 1906, the priority of the tenant and the application are checked and a scheduler priority class assigned accordingly. In practice, the other variables (e.g. bandwidth threshold, queue depth threshold, service period threshold) can be set based on the tenant priority, application priority, service level agreement, etc. Alternatively, the class can be assigned based on a complex conditional such as: (bandwidth usage>bandwidth threshold AND tenant priority==2). A data transfer queue can be assigned to a scheduler priority class by writing directly into a variable such as the scheduler priority class indicator 1505 or by queueing a task for a processor that executes the assignment. For example, a P4 pipeline can schedule a task for a CPU that, when executed, changes the scheduler priority class indicator 1505

Figure 20:
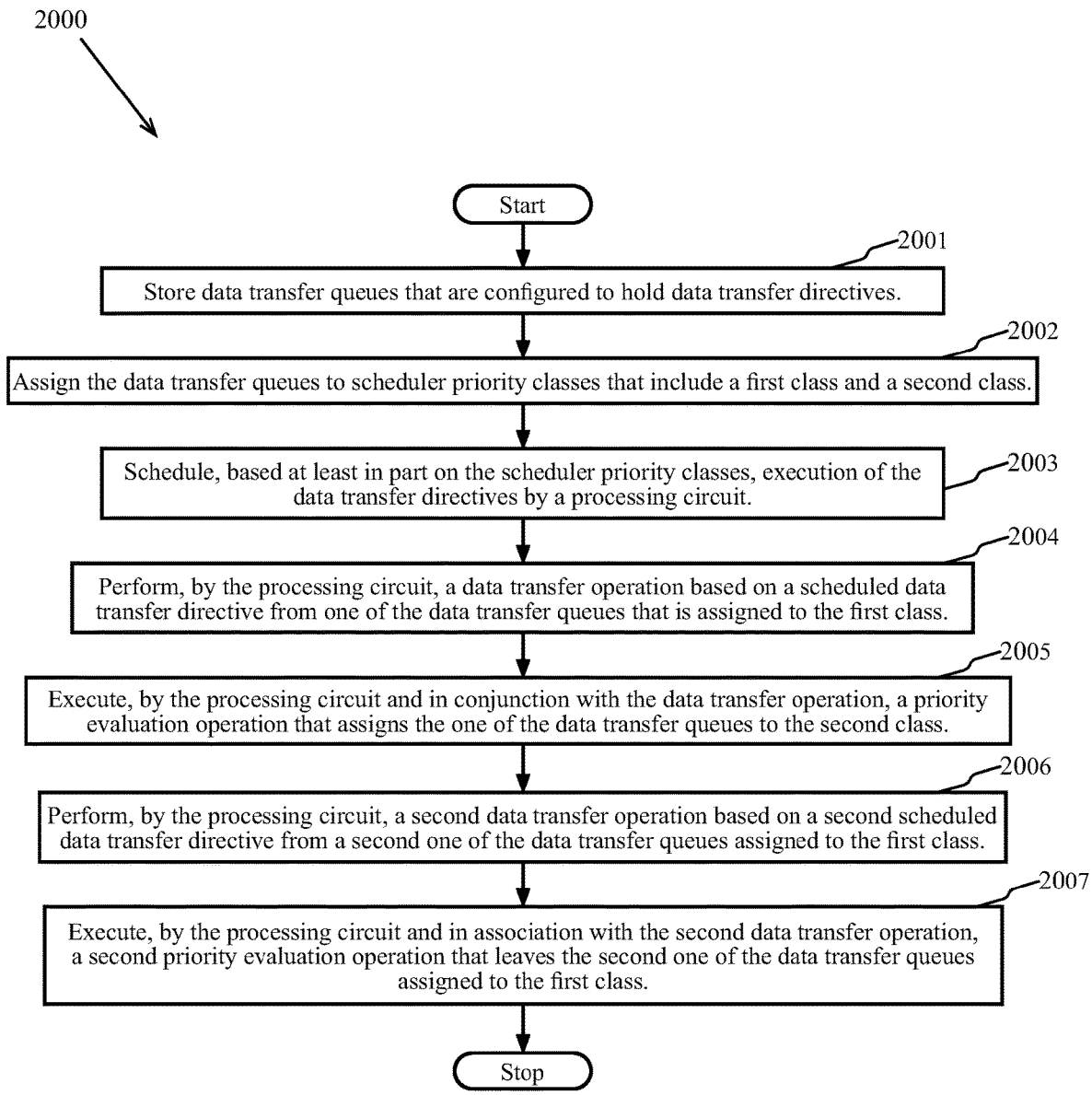
FIG. 20 is a high-level block diagram of a method for adaptive quality of service for latency critical applications according to some aspects.

FIG. 20 is a high-level block diagram of a method for adaptive quality of service for latency critical applications according to some aspects. After the start, at block 2001 the method can store data transfer queues that are configured to hold data transfer directives. At block 2002 the method can assign the data transfer queues to scheduler priority classes that include a first class and a second class. At block 2003 the method can schedule, based at least in part on the scheduler priority classes, execution of the data transfer directives by a processing circuit. At block 2004 the method can perform, by the processing circuit, a data transfer operation based on a scheduled data transfer directive from one of the data transfer queues that is assigned to the first class. At block 2005 the method can execute, by the processing circuit and in conjunction with the data transfer operation, a priority evaluation operation that assigns the one of the data transfer queues to the second class. At block 2006 the method can perform, by the processing circuit, a second data transfer operation based on a second scheduled data transfer directive from a second one of the data transfer queues assigned to the first class. At block 2007 the method can execute, by the processing circuit and in association with the second data transfer operation, a second priority evaluation operation that leaves the second one of the data transfer queues assigned to the first class.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claims is:

1. A method implemented by a network appliance, the method comprising:
   storing data transfer queues that are configured to hold data transfer directives;
   assigning the data transfer queues to scheduler priority classes that include a first class and a second class;
   scheduling, based at least in part on the scheduler priority classes, execution of the data transfer directives by a processing circuit;
   performing, by the processing circuit, a data transfer operation based on a scheduled data transfer directive from one of the data transfer queues that is assigned to the first class; and
   executing, by the processing circuit and in conjunction with the data transfer operation, a priority evaluation operation that assigns the one of the data transfer queues to the second class.

2. The method implemented by the network appliance of claim 1, the method further comprising:
   performing, by the processing circuit, a second data transfer operation based on a second scheduled data transfer directive from a second one of the data transfer queues assigned to the first class; and
   executing, by the processing circuit and in association with the second data transfer operation, a second priority evaluation operation that leaves the second one of the data transfer queues assigned to the first class.

3. The method implemented by the network appliance of claim 1, wherein the data transfer queues include InfiniB and RDMA send queues.

4. The method implemented by the network appliance of claim 1, wherein the data transfer queues include ethernet transmit queues.

5. The method implemented by the network appliance of claim 1, wherein the data transfer queues include NVMe submission queues.

6. The method implemented by the network appliance of claim 1, wherein the priority evaluation operation assigns the one of the data transfer queues to the second class based at least in part on a bandwidth usage of the one of the data transfer queues.

7. The method implemented by the network appliance of claim 1, wherein the priority evaluation operation assigns the one of the data transfer queues to the second class based at least in part on a queue depth of the one of the data transfer queues.

8. The method implemented by the network appliance of claim 1, wherein the priority evaluation operation assigns the one of the data transfer queues to the second class based at least in part on a last serviced time of the one of the data transfer queues.

9. The method implemented by the network appliance of claim 1, wherein the priority evaluation operation assigns the one of the data transfer queues to the second class based at least in part on a size of the data transfer operation of the one of the data transfer queues.

10. The method implemented by the network appliance of claim 1, wherein the priority evaluation operation assigns the one of the data transfer queues to the second class based at least in part on a metadata value that is associated with the data transfer operation, wherein the metadata value indicates at least one of a tenant, a service level agreement, and an application.

11. A network appliance comprising:
a memory configured to store a plurality of data transfer queues that are assigned to a plurality of scheduler priority classes including a first class and a second class;
a scheduler configured to schedule data transfer directives held by the data transfer queues for execution by a processing circuit, the scheduling based at least in part on the scheduler priority classes; and
the processing circuit, the processing circuit configured to:
perform a data transfer operation based on a scheduled data transfer directive from one of the data transfer queues that is assigned to the first class, and
execute, in association with the data transfer operation, a priority evaluation operation that assigns the one of the data transfer queues to the second class.

12. The network appliance of claim 11 wherein the processing circuit is a P4 packet processing pipeline.

13. The network appliance of claim 11 wherein the processing circuit is configured to:
perform a second data transfer operation based on a second scheduled data transfer directive from a second one of the data transfer queues assigned to the first class; and
execute, in conjunction with the second data transfer operation, a second priority evaluation operation that leaves the second one of the data transfer queues assigned to the first class.

14. The network appliance of claim 11, wherein the data transfer queues include at least one of an InfiniB and RDMA send queue, an ethernet transmit queue, and an NVMe submission queue.

15. The network appliance of claim 11, wherein the priority evaluation operation assigns the one of the data transfer queues to the second class based at least in part on a bandwidth usage of the one of the data transfer queues.

16. The network appliance of claim 11, wherein the priority evaluation operation assigns the one of the data transfer queues to the second class based at least in part on a queue depth of the one of the data transfer queues.

17. The network appliance of claim 11, wherein the priority evaluation operation assigns the one of the data transfer queues to the second class based at least in part on a last serviced time of the one of the data transfer queues.

18. The network appliance of claim 11, wherein the priority evaluation operation assigns the one of the data transfer queues to the second class based at least in part on a size of the data transfer operation of the one of the data transfer queues.

19. The network appliance of claim 11, wherein the priority evaluation operation assigns the one of the data transfer queues to the second class based at least in part on a metadata value that is associated with the data transfer operation, wherein the metadata value indicates at least one of a tenant, a service level agreement, and an application.

20. A system comprising:
a means for storing a plurality of data transfer queues that are assigned to a plurality of scheduler priority classes and that are configured to hold data transfer directives;
a means for scheduling the data transfer directives for execution based at least in part on the scheduler priority classes; and
a means for reassigning the scheduler priority classes of the data transfer queues in conjunction performing data transfer operations based on the data transfer directives that are scheduled for execution.

* * * * *